United States Patent Office 3,349,145
Patented Oct. 24, 1967

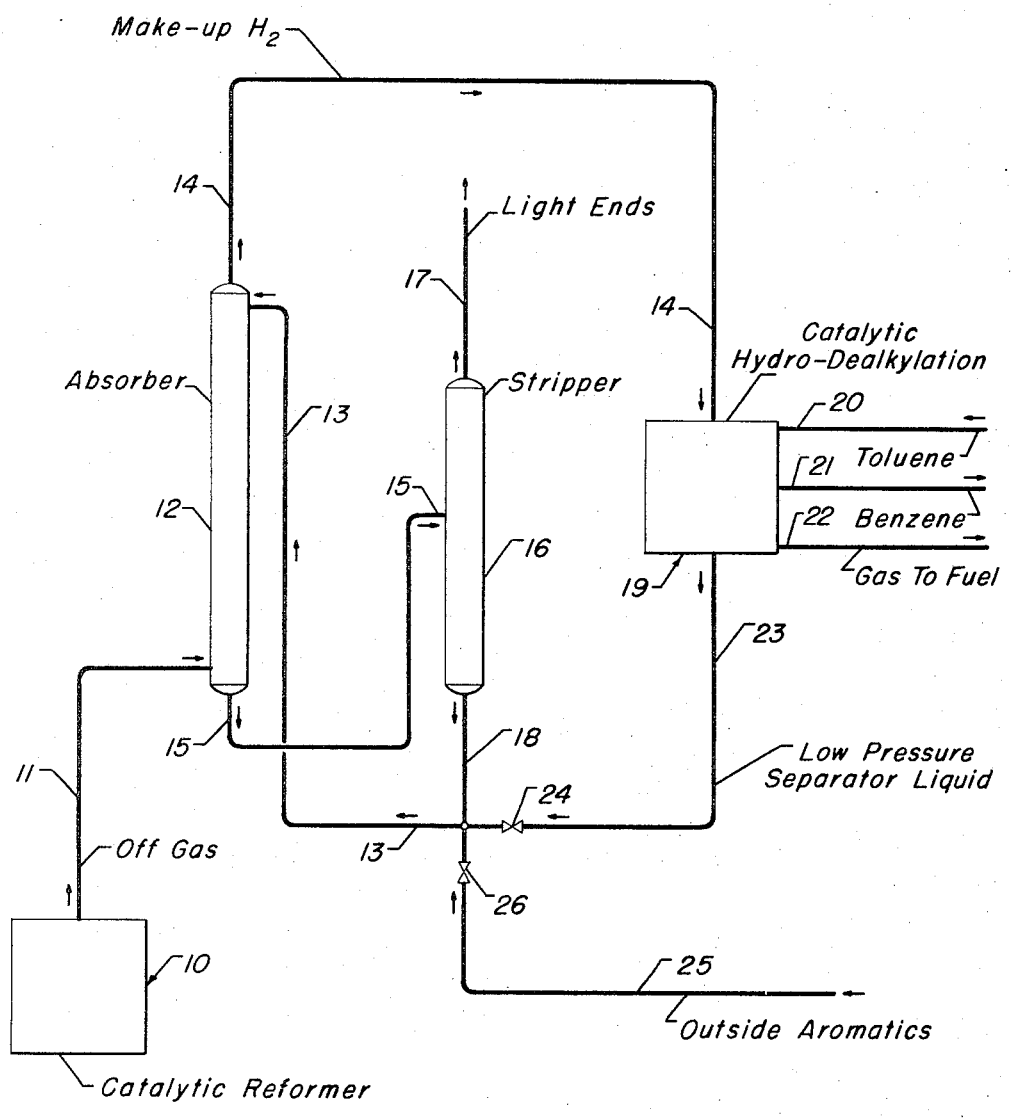

3,349,145
HYDRODEALKYLATION PROCESS USING
IMPURE MAKE-UP HYDROGEN
Kenneth D. Uitti, Bensenville, Ill., assignor to Universal
Oil Products Company, Des Plaines, Ill., a corporation
of Delaware
Filed Aug. 26, 1965, Ser. No. 482,682
12 Claims. (Cl. 260—672)

ABSTRACT OF THE DISCLOSURE

Purifying crude makeup $H_2$ to a hydrodealkylation reaction zone by scrubbing with a $C_9+$ aromatic lean oil to remove paraffins from the crude $H_2$ stream.

---

This invention relates to a process for the dealkylation of alkyl aromatic hydrocarbons and other alkyl aromatic compounds. More particularly, the invention is concerned with improvements in the hydrodealkylation art which permit the use, as make-up hydrogen to the hydrodealkylation reaction zone, of relatively impure hydrogen containing appreciable amounts of paraffinic hydrocarbons.

The hydrodealkylation of aromatic hydrocarbons, such as the conversion of toluene or xylene to benzene and the conversion of methyl naphthalene to naphthalene, is well known. The reaction may be effected thermally or catalytically, in the presence of excess hydrogen, usually at a temperature in the range of from about 1000° to about 1500° F. and under a total pressure in the range of from about 300 to about 1000 p.s.i.g. When a catalyst is employed, the feedstock is usually charged at a liquid hourly space velocity (volume of feed per volume of catalyst per hour) in the range from about 0.1 to about 20. Such dealkylation catalyst may comprise a metal composited on a solid support or carrier, the metal being selected from the platinum group of the Periodic Table; in addition, other metals which may be used include cesium, tungsten, rhenium and chromium. A commonly employed catalyst comprises chromia composited on a suitable refractory inorganic oxide such as alumina, particularly a high surface alumina such as gamma-, eta-, or theta-alumina, the chromia being present in the catalyst in an amount of approximately 10% to 20% by weight of chromium oxide based on the alumina. For a more thorough background of the subject matter, including a detailed flow scheme of a typical hydrodealkylation process, the reader's attention is directed to U.S. Patent No. 3,204,007, issued August 31, 1965.

A problem which has confronted workers in this art is the maintenance of hydrogen purity in the reaction zone and recycle hydrogen system of a hydrodealkylation process unit. The principal byproduct of the reaction is methane, together with a lesser amount of ethane. Since the reaction consumes hydrogen, requiring hydrogen make-up from an external source thereof, means must be provided to limit the light hydrocarbon concentration in the reactor effluent. An unduly high methane concentration leads to carbon deposition in the charge heater, reactor and downstream equipment, as well as adversely affecting the conversion per pass. As indicated in U.S. Patent No. 3,204,007, it is desirable to maintain the mol ratio of hydrogen to methane plus ethane in the reactor effluent at least as high as 0.6.

Another related difficulty concerns the minimizing of hydrogen consumption. The primary cause of excessive hydrogen consumption is the presence of paraffinic hydrocarbons in the make-up hydrogen, especially paraffins containing three or more carbon atoms per molecule. Such paraffins, when subjected to hydrodealkylating conditions along with the alkyl aromatic hydrocarbon feed, are hydrocracked substantially all the way to methane. This has the doubly bad effect of consuming a disproportionately large amount of hydrogen, and of further increasing the methane content of the reactor effluent, both on an absolute and on a percentage basis, and the effect becomes more pronounced with increasing carbon number. For example, 1 mol of butane converts to 4 mols of methane with the consumption of 3 mols of $H_2$, while 1 mol of hexane converts to 6 mols of methane accompanied by the consumption of 5 mols of $H_2$. The use of high grade make-up hydrogen, such as that manufactured by steam-methane reforming, affords one solution but it is expensive and not always economically attractive. Frequently there is available to the refiner a source of relatively impure hydrogen from a net hydrogen-producing process unit such as a catalytic naphtha reformer. The hydrogen-containing offgas from a cat reformer cannot, however, be fed directly to a hydrodealkylation reaction zone because it is contaminated with substantial amounts of $C_1$–$C_6$ paraffins, e.g., methane, ethane, propane, n-butane, isobutane, n-pentane, isopentanes, n-hexane, and isohexanes. If the catalytic reforming is effected at low pressure, e.g., at about 100–300 p.s.i.g., the offgas will also comprise significant quantities of heptanes and octanes.

It has been previous practice to clean up or purify the reformer offgas by scrubbing it with an absorption oil. In order to function effectively as an absorbing medium, such oil must have a higher boiling point than the heaviest paraffin to be removed from the reformer hydrogen, and according to this practice it was customary to employ as the absorption oil an atmospheric or vacuum distillate fraction such as kerosene, diesel oil, or light vacuum gas oil. Although it is possible by this means to eliminate from the reformer hydrogen most of the propane and practically all of the $C_4+$ paraffins originally present therein, I have found that the absorption step is actually much less effective than heretofore believed when the absorption oil comprises a distillate fraction. The reason therefor lies in the unavoidable entrainment of the absorber oil in the absorber lean gas, at least as encountered in commercial operations; that is to say, the absorber oil is physically carried over in the form of fine droplets suspended in the scrubbed make-up hydrogen stream into the hydrodealkylation reactor or recycle hydrogen system. In a commercial countercurrent absorber column, the relative quantity of oil so entrained ranges from about 0.1 mol percent to about 1.5 mol percent of the lean oil charged to the absorber, depending upon linear gas velocity and the efficiency of the entrainment separation means. Of course, there is also some oil loss due to volatilization or evaporation, but this mechanism is relatively minor in comparison with entrainment loss because of the low volatility of the oil and the high absorption pressures customarily employed. Depending upon its natural origin and boiling range, a conventional absorber oil comprises from about 40% to about 80% of mixed n-paraffins and isoparaffins containing from about 11 to about 20 carbon atoms per molecule. The consequence of conventional practice becomes apparent: whereas one effectively removes the $C_4$–$C_8$ paraffins originally present in the reformer offgas, these are replaced with heavier paraffins; even though the molal quantity of oil entrained is much less than the molal quantity of $C_4$–$C_8$ paraffins absorbed, the greater hydrogen equivalency of the absorber oil magnifies the hydrogen-consuming and methane-forming effect. The hydrogen equivalency of a hydrocarbon is defined as the number of mols of $H_2$ required to convert one mol of such hydrocarbon to $CH_4$. By way of illustration, a given reformer offgas is scrubbed in a countercurrent, high pressure absorber with an absorption oil consisting of a kerosene fraction having an average carbon number of $C_{13}$, under conditions such that $C_3$–$C_8$ paraffins are absorbed to an extent corresponding to 250 mol equivalents of hydrogen; but at the same time, given a 1% entrainment of lean absorber oil, approximately 60 hydrogen mol equivalents of oil are added to the scrubbed gas. The net reduction is therefore 190, not 250, hydrogen mol equivalents.

In accordance with the present invention, I am able to use, as make-up hydrogen to a hydrodealkylation process unit, comparatively impure hydrogen, such as cat reformer offgas comprising one or more $C_3+$ paraffinic hydrocarbons, while nevertheless very substantially reducing extraneous hydrogen consumption and methane formation. Briefly stated, the impure hydrogen stream is passed through an absorption zone, prior to its introduction to the hydrodealkylation process, and therein the gas is scrubbed with a liquid absorbent consisting essentially of an aromatic hydrocarbon or mixture of aromatic hydrocarbons, such absorbent being substantially free of paraffins. A major portion of propane and virtually all of the $C_4+$ paraffins can be removed from the gas stream. Although, for a given apparatus and specified absorption conditions, the absorbent entrainment remains about the same as for a paraffinic absorbent, the aromatic hydrocarbon has a much lower hydrogen equivalency than a paraffinic absorbent having the same boiling point. If the aromatic hydrocarbon contains alkyl substituents, only the alkyl groups are converted to methane, the remainder of the molecule being converted to benzene or a polynuclear aromatic, as the case may be, which frequently will be the principal desired product of the hydrodealkylation process.

In one embodiment, this invention relates to an improvement in a process for the hydrodealkylation of an alkyl aromatic compound wherein said compound is hydrodealkylated at hydrodealkylating conditions in a reaction zone in the presence of hydrogen whereby hydrogen is consumed requiring replenishment thereof, which improvement comprises withdrawing from a source of impure hydrogen a gas comprising hydrogen and a paraffinic hydrocarbon containing at least 3 carbon atoms per molecule, scrubbing said gas with a liquid absorbent consisting essentially of an aromatic hydrocarbon, thereby absorbing a substantial portion of said paraffinic hydrocarbon in said absorbent and passing the resulting scrubbed gas of reduced paraffin content to said reaction zone to replenish the hydrogen consumed therein.

Another embodiment of the present invention is directed to an improvement in a process for the hydrodealkylation of an alkyl aromatic hydrocarbon feed wherein said feed is hydrodealkylated at hydrodealkylating conditions in a reaction zone in the presence of hydrogen whereby hydrogen is consumed requiring replenishment thereof, which improvement comprises withdrawing from a source of impure hydrogen a hydrogen-rich gas further comprising $C_1$–$C_4$ paraffins, scrubbing said gas, under a pressure of 150–1500 p.s.i.g., with a liquid absorbent consisting essentially of an aromatic hydrocarbon, thereby absorbing a substantial portion of said paraffins in said absorbent, and passing the resulting scrubbed gas of reduced paraffin content to said reaction zone to replenish the hydrogen consumed therein.

A further embodiment of this invention provides an improvement in a process for the catalytic hydrodealkylation of an alkyl aromatic hydrocarbon feed wherein said feed is passed to a reaction zone containing a dealkylation catalyst and is hydrodealkylated at hydrodealkylating conditions in the presence of an excess of hydrogen whereby hydrogen is consumed requiring replenishment thereof, which improvement comprises withdrawing from a source of impure hydrogen a hydrogen-rich gas comprising $C_1$–$C_5$ paraffins, counter-currently scrubbing said gas, under a pressure of 200–1000 p.s.i.g. and at a temperature below 200° F., with a liquid absorbent consisting essentially of a mixture of $C_9+$ aromatic hydrocarbons, thereby absorbing a substantial portion of said paraffins in said absorbent, and passing the resulting scrubbed gas of reduced paraffin content and substantially free of paraffins containing more than 3 carbon atoms per molecule to said reaction zone to replenish the hydrogen consumed therein.

The source of impure make-up hydrogen may be any net hydrogen-producing process such as a catalytic naphtha reformer, as previously indicated, or it may be a paraffin dehydrogenation unit, ethane or naphtha cracker producing ethylene and/or propylene, fluid catalytic cracking unit, fluid coker and the like. A catalytic reforming unit is a preferred source of make-up hydrogen because the offgas therefrom is generally hydrogen-rich, e.g., comprising more than 50 mol percent $H_2$, and will be available at a pressure in the range of about 100 to about 800 p.s.i.g. The gas may be scrubbed at substantially reformer pressure or it may be compressed to a higher pressure before entering the absorption zone. As previously indicated, the impurities in the crude hydrogen stream will generally include methane, ethane, propane, n-butane, isobutane, pentanes, and $C_6+$ paraffins including hexanes, heptanes, and octanes.

The aromatic hydrocarbon utilized as the liquid absorbent may comprise, either in pure form or in admixture with other aromatics, benzene, toluene, ethylbenzene, xylenes, and higher polyalkyl benzenes such as trimethylbenzene, tetramethylbenzene, pentamethylbenzene, and hexamethylbenzene. However, alkyl substituted mononuclear aromatics having more than 3 methyl groups per nucleus or having an alkyl group containing more than 3 carbon atoms are less preferred because of their higher hydrogen equivalency. The aromatic absorbent may also comprise unsubstituted or alkyl substituted polynuclear aromatic hydrocarbons such as naphthalene, methylnapthalene, polyalkylnapthalenes, and diphenyl. The lean absorbent should be substantially free of paraffinic hydrocarbons. For the purpose of this application, an absorbent is deemed essentially 100% aromatic when it contains less than about 0.6 mol percent of non-aromatics. In order to provide effective absorption of the paraffins as well as to facilitate closed cycle regeneration of the rich oil by distillation or stripping, it is preferred that the boiling point or initial boiling point of the aromatic absorbent be substantially higher than the boiling point of the heaviest paraffin which it is desired to remove from the make-up hydrogen stream; desirably such temperature difference should be at least 20° F. and more preferably about 50° F. or more. When the crude hydrogen contains $C_6$, $C_7$ or $C_8$ paraffins, a preferred absorbent therefore comprises a $C_9+$ aromatic hydrocarbon either in pure form or admixed with other $C_9+$ aromatics, as for example, propyl benzene, isopropylbenzene, pseudocumene, mesitylene, napthalene, methylnaphthalene, and diphenyl. A convenient supply of a $C_9+$ aromatic fraction is often available as the heavy bottoms from a BTX fractionator train.

The absorption step is preferably effected in a counter-current flow, multistage absorber column provided with from about 5 to about 70 or more contacting stages. The lean oil to crude gas mol ratio is generally in the range of about 0.2 to about 2. The absorption pressure is typically in the range of from about 150 to about 1500 p.s.i.g., and preferably in the range of from about 200 to about 1000 p.s.i.g. The maximum temperature of the absorbent preferably should be limited to below about 200° F. and generally will be of the order of 80°–150° F., although lower temperatures may be achieved if desired, using refrigerant cooling of the inflowing streams or refrigerant intercooling. The heat of absorption may be expected to result in an absorbent temperature rise of about 10°–50° F; however, this can be controlled or limited, when desired, by appropriate intercooling. Absorber conditions can be and are preferably designed to remove from the crude hydrogen stream a major portion of the propane and practically all of the $C_4$ and heavier paraffins. Substantial removal of methane and ethane is not usually economically justified since very high pressures and/or heavy refrigeration would be required. Also, the $C_3$–$C_6$ paraffins so absorbed are themselves a valuable product and it is often advantageous to separately recover a fraction rich in $C_3$–$C_6$ paraffins having a low $C_1$–$C_2$ content in order to simplify subsequent fractionation steps.

The absorber rich oil is preferably regenerated in a closed cycle operation using a conventional multistage stripping or distillation column provided with from about 5 to about 40 contacting stages, operated at a pressure of from about 20 to about 200 p.s.i.g. and lower than absorber pressure, and with an external reflux to feed mol ratio in the range of 0.08–1.5. The stripper net overhead comprises all of the paraffins removed from the crude hydrogen stream and is essentially free of absorption oil. The stripper bottoms, essentially free of paraffins, is cooled and returned as lean oil to the absorber column. Make-up absorbent may be continuously or intermittently charged to the system at a rate sufficient to replace that lost to the scrubbed hydrogen stream by entrainment. According to specific embodiments of the invention, the make-up absorbent, as well as the absorbent initially charged to the system at start-up, may be obtained as a slip stream of the alkyl aromatic feedstock charged to the hydrodealkylation unit; or, alternatively, it may comprise a normally liquid portion of the effluent from the hydrodealklation zone such as atmospheric separator liquid, or the bottoms or overhead stream of a hydrodealkylation product fractionation column.

The invention herein is more particularly described in conjunction with the accompanying drawing which is a simplified schematic flow diagram of a two column absorber-stripper system designed to treat hydrogen-rich off-gas from a catalytic reforming process unit. It will be understood that equipment such as pumps, valves, controls, heat recovery circuits, start-up lines, etc., which are omitted from the flow sheet, will be supplied as required in accordance with accepted practice.

With reference to the drawing, box 10 indicates a catalytic reformer processing naphtha into high octane motor fuel. The reformer generates hydrogen, designated as offgas, which is taken from a high pressure separator through line 11 at substantially separator pressure into a multistage absorber column 12. This offgas comprises approximately 50–90 mol % hydrogen and the remainder consists essentially of $C_1$–$C_6$ paraffins, the specific proportion of each paraffin depending upon reforming conditions, high pressure separator pressure and temperature, and type of reformer feedstock. The offgas is passed upwardly through column 12 and is scrubbed by a descending stream of aromatic absorbent admitted to column 12 through line 13. The resulting lean or scrubbed gas is withdrawn through line 14 and charged as make-up hydrogen to a catalytic hydrodealkylation process unit 19. Rich absorbent is withdrawn from the bottom of column 12 and charged by line 15 to a multistage stripper column 16. A light ends fraction, rich in $C_3$–$C_6$ paraffins, is taken overhead via line 17. The light ends fraction may further be subjected to desiccant drying and fractionation in downstream separation facilities. Stripped lean absorbent is returned to the absorber through lines 18 and 13 which will be provided with heat exchangers and coolers in the usual manner. Make-up absorbent to replace entrainment loss thereof in line 14 is added as required to the system either through line 25 and valve 26 or through line 23 and valve 24.

A typical flow arrangement for hydrodealkylation process unit 19 is disclosed in the above referred to U.S. Patent 3,204,007. The make-up hydrogen introduced thereto through line 14 is usually added to the high pressure separator or recycle hydrogen compressor suction line under separator pressure control at a sufficient rate to maintain a predetermined separator pressure. The particular dealkylation unit illustrated is a catalytic process for the conversion of toluene to benzene. Toluene charge stock is added to the unit through line 20, a net benzene product is withdrawn from the unit through line 21, and a net lean gas to fuel is withdrawn from the unit through line 22. Line 23 conects with the low pressure or atmospheric separator of the hydrodealkylation unit and may be used to pass such low pressure separator liquid as make-up absorbent for the absorber-stripper system. This separator liquid may contain as much as 0.5 mol percent of methane and ethane, but concentrations of this small magnitude are insignificant, the low pressure separator liquid falling within the definition of essentially 100% aromatics. Alternatively, line 23 may connect with the benzene column overhead whereby to supply pure benzene as a liquid absorbent, or it may connect with the toluene column overhead whereby to supply pure toluene as the liquid absorbent, or it may connect with the toluene column bottoms to provide a $C_8+$ aromatic fraction as the liquid absorbent. The invention is not limited, however, to use in conjunction with catalytic hydrodealkylation processes and, accordingly, box 19 may represent a thermal dealkylation process and it may receive aromatic charge stock other than toluene.

The practice of my invention is further illustrated by the following specific example in which a reformer offgas stream of 75% hydrogen purity is processed at the rate of approximately 11 million s.c.f.d. using the flow scheme of the drawing. The absorber oil consists essentially of a mixture of $C_9+$ aromatic hydrocarbons (trimethylbenzenes, propylbenzenes, cumene, naphthalene and diphenyl) having an average molecular weight of 125, a gravity of 20° API, and a hydrogen equivalency of 1.5. A material balance for the absorber-stripping system is given in Table I while operating conditions for each of the columns is given in Table II.

TABLE I

[All flows in mols/hr.]

|  | Gas to Absorber (line 11) | Lean oil to Absorber (line 13) | Lean Gas from Absorber (line 14) | Rich Oil from Absorber (line 15) | Stripper Net Overhead Gas (line 17) | Absorber Make-up Oil (line 25) |
|---|---|---|---|---|---|---|
| $H_2$ | 947.2 |  | 941.2 | 6.0 | 6.0 |  |
| $C_1$ | 116.6 |  | 111.3 | 5.3 | 5.3 |  |
| $C_2$ | 81.6 |  | 78.8 | 2.8 | 2.8 |  |
| $C_3$ | 57.4 |  | 4.0 | 53.4 | 53.4 |  |
| $iC_4$ | 12.2 |  |  | 12.2 | 12.2 |  |
| $nC_4$ | 13.8 |  |  | 13.8 | 13.8 |  |
| $iC_5$ | 5.1 |  |  | 5.1 | 5.1 |  |
| $nC_5$ | 2.6 |  |  | 2.6 | 2.6 |  |
| $C_6+$ | 7.1 |  |  | 7.1 | 7.1 |  |
| Oil |  | 511.3 |  | 3.8 | 507.5 | 3.8 |
| Net available $H_2$ [1] | 603 |  | 849 |  |  |  |
| $CH_4$ Equivalents [2] | 640 |  | 290 |  |  |  |
| Net $H_2$:$CH_4$ ratio | 0.94 |  | 2.93 |  |  |  |

[1] Net available $H_2$ is computed as mols of free $H_2$ present, less the hydrogen equivalents of the $C_2$–$C_6+$ paraffins and the absorber oil.
[2] Methane equivalents is computed as mols of free methane present, plus methane formed by 100% conversion of the $C_2$–$C_6+$ paraffins to methane and 100% dealkylation of entrained absorber oil to unsubstituted aromatics and methane.

TABLE II

|  | Absorber | Stripper |
| --- | --- | --- |
| Number of trays | 30 | 20 |
| Operating pressure, p.s.i.g | 520 | 60 |
| Column ΔP, p.s.i. | 10 | 5 |
| Top tower temperature, °F | 100 | 170 |
| Bottoms temperature, °F | 130 | 480 |
| Lean oil:crude gas mol ratio | 0.41 | |
| External reflux:Feed mol ratio | | 0.5 |

It will be observed from Table I that the scrubbed make-up hydrogen stream has a net available hydrogen content of 849 mols per hour and a $CH_4$ equivalency of 290 mols per hour or a net $H_2$ to $CH_4$ mol ratio of 2.93. A conventional paraffinic absorber oil having approximately the same boiling range as the aromatic absorbent is a light kerosene cut having a boiling range of 300°–450° F., comprising 80 mol percent $C_9$–$C_{13}$ n-paraffins and isoparaffins, and having a hydrogen equivalency of 8.4. If such conventional oil were substituted for the aromatic absorbent, at an equal lean oil entrainment rate the scrubbed hydrogen stream would have a net available hydrogen content of 822 mols per hour and a $CH_4$ equivalency of 316 mols per hour or a net $H_2$ to $CH_4$ mol ratio of 2.60. The present invention therefore achieves an 11% increase in effectiveness with no increased utilities cost or capital investment. The advantages of this invention become even more pronounced with increasing entrainment rate which, as indicated hereinabove, may be as high as 1.5% of the absorber lean oil rate, depending upon pressure and gas loading of the absorber column.

The invention is of course, applicable to the hydrodealkylation of aromatic compounds other than aromatic hydrocarbons such as cresols, xylenols, methyl naphthols, etc.

I claim as my invention:

1. In a process for the hydrodealkylation of an alkyl aromatic compound wherein said compound is hydrodealkylated at hydrodealkylating conditions in a reaction zone in the presence of hydrogen whereby hydrogen is consumed requiring replenishment thereof, the improvement which comprises withdrawing from a source of impure hydrogen a gas comprising hydrogen and a paraffinic hydrocarbon containing at least 3 carbon atoms per molecule, scrubbing said gas in an absorption zone with a lean oil consisting essentially of a $C_9+$ aromatic hydrocarbon, thereby absorbing a substantial portion of said paraffinic hydrocarbon in said lean oil, passing the resulting scrubbed gas of reduced paraffin content and substantially free of paraffins containing more than 4 carbon atoms per molecule to said reaction zone to replenish the hydrogen consumed therein, passing the resulting rich oil from said absorption zone to a stripping zone and stripping paraffins therefrom, and returning the resulting stripped oil to said absorption zone as said lean oil.

2. In a process for the hydrodealkylation of an alkyl aromatic hydrocarbon feed wherein said feed is hydrodealkylated at hydrodealkylating conditions in a reaction zone in the presence of hydrogen whereby hydrogen is consumed requiring replenishment thereof, the improvement which comprises withdrawing from a source of impure hydrogen a gas comprising hydrogen and $C_3$–$C_4$ paraffins, scrubbing said gas in an absorption zone under superatmospheric pressure with a lean oil consisting essentially of a $C_9+$ aromatic hydrocarbon, thereby absorbing a substantial portion of said paraffins in said lean oil, passing the resulting scrubbed gas of reduced paraffin content and substantially free of paraffins containing more than 4 carbon atoms per molecule to said reaction zone to replenish the hydrogen consumed therein, passing the resulting rich oil from said absorption zone to a stripping zone and stripping paraffins therefrom, and returning the resulting stripped oil to said absorption zone as said lean oil.

3. In a process for the hydrodealkylation of an alkyl aromatic hydrocarbon feed wherein said feed is hydrodealkylated at hydrodealkylating conditions in a reaction zone in the presence of hydrogen wherein hydrogen is consumed requiring replenishment thereof, the improvement which comprises withdrawing from a source of impure hydrogen a hydrogen-rich gas comprising $C_1$–$C_4$ paraffins, scrubbing said gas in an absorption zone under a pressure of 150–1500 p.s.i.g. with a lean oil consisting essentially of a $C_9+$ aromatic hydrocarbon, thereby absorbing a substantial portion of said paraffins in said lean oil, passing the resulting scrubbed gas of reduced paraffin content and substantially free of paraffins containing more than 4 carbon atoms per molecule to said reaction zone to replenish the hydrogen consumed therein, passing the resulting rich oil from said absorption zone to a stripping zone and stripping paraffins therefrom, and returning the resulting stripped oil to said absorption zone as said lean oil.

4. The process of claim 3 wherein said lean oil comprises a normally liquid portion of the effluent from said reaction zone.

5. The process of claim 3 wherein said source of impure hydrogen is a catalytic reformer.

6. In a process for the hydrodealkylation of an alkyl aromatic hydrocarbon feed wherein said feed is hydrodealkylated at hydrodealkylating conditions in a reaction zone in the presence of hydrogen whereby hydrogen is consumed requiring replenishment thereof, the improvement which comprises withdrawing from a source of impure hydrogen a hydrogen-rich gas comprising $C_1$–$C_6$ paraffins, scrubbing said gas in an absorption zone under superatmospheric pressure with a lean oil consisting essentially of an aromatic hydrocarbon containing at least 9 carbon atoms per molecule, thereby absorbing a substantial portion of said paraffins in said lean oil, passing the resulting scrubbed gas of reduced paraffin content and substantially free of paraffins containing more than 3 carbon atoms per molecule to said reaction zone to replenish the hydrogen consumed therein, passing the resulting rich oil from said absorption zone to a stripping zone and stripping paraffins therefrom, and returning the resulting stripped oil to said absorption zone as said lean oil.

7. The process of claim 6 wherein said lean oil comprises an alkylbenzene or polyalkylbenzene in which the total number of carbon atoms in the alkyl group(s) is 3.

8. The process of claim 6 wherein said lean oil comprises naphthalene.

9. The process of claim 6 wherein said lean oil comprises diphenyl.

10. In a process for the catalytic hydrodealkylation of an alkyl aromatic hydrocarbon feed wherein said feed is passed to a reaction zone containing a dealkylation catalyst and is hydrodealkylated at hydrodealkylating conditions in the presence of an excess of hydrogen whereby hydrogen is consumed requiring replenishment thereof, the improvement which comprises withdrawing from a source of impure hydrogen a hydrogen-rich gas comprising $C_1$–$C_5$ paraffins; countercurrently scrubbing said gas in an absorption zone, under a pressure of 200–1000 p.s.i.g. and at a temperature below 200° F., with a lean oil consisting essentially of a mixture of $C_9+$ aromatic hydrocarbons, thereby absorbing a substantial portion of said paraffins in said lean oil; passing the resulting scrubbed gas of reduced paraffin content and substantially free of paraffins containing more than 3 carbon atoms per molecule to said reaction zone to replenish the hydrogen consumed therein, passing the resulting rich oil from said absorption zone to a stripping zone and stripping paraffins therefrom, and returning the resulting stripped oil to said absorption zone as said lean oil.

11. In a process for the hydrodealkylation of an alkyl aromatic compound wherein said compound is hydrodealkylated at hydrodealkylating conditions in a reaction zone in the presence of an excess of hydrogen whereby hydrogen is consumed requiring replenishment thereof, the improvement which comprises withdrawing from a source of impure hydrogen a hydrogen-rich gas comprising a paraffinic hydrocarbon containing at least 3 carbon atoms per molecule; scrubbing said gas in an absorption zone, under superatmospheric pressure, with a lean oil consisting essentially of a $C_9+$ aromatic hydrocarbon, thereby absorbing a major portion of said paraffinic hydrocarbon in said lean oil; passing the resulting scrubbed gas of reduced paraffin content and substantially free of paraffins containing more than 4 carbon atoms per molecule to said reaction zone to replenish the hydrogen consumed therein; passing the resulting rich oil from said absorption zone to a stripping zone and stripping paraffins therefrom; and returning the resulting stripped oil to said absorption zone as said lean oil.

12. The process of claim 10 wherein said lean oil comprises a normally liquid portion of the effluent from said reaction zone.

References Cited
UNITED STATES PATENTS

| | | | |
|---|---|---|---|
| 2,929,775 | 3/1960 | Aristoff et al. | 260—672 |
| 3,213,150 | 10/1965 | Cabbage | 260—672 |
| 3,291,849 | 12/1966 | King et al. | 260—672 |

DELBERT E. GANTZ, *Primary Examiner.*

G. E. SCHMITKONS, *Assistant Examiner.*